United States Patent [19]

Cisneros et al.

[11] Patent Number: 5,539,559
[45] Date of Patent: Jul. 23, 1996

[54] APPARATUS AND METHOD FOR PHOTONIC CONTENTION RESOLUTION IN A LARGE ATM SWITCH

[75] Inventors: Arturo Cisneros, Lincroft; Tirunell V. Lakshman, Eatontown, both of N.J.

[73] Assignee: Bell Communications Research Inc., Livingston, N.J.

[21] Appl. No.: 934,098

[22] Filed: Aug. 21, 1992

Related U.S. Application Data

[63] Continuation-in-part of Ser. No. 629,576, Dec. 18, 1990, Pat. No. 5,157,654.

[51] Int. Cl.$^6$ .................................................. H04J 14/02
[52] U.S. Cl. .................... 359/117; 359/139; 359/128; 370/60.1
[58] Field of Search .................... 359/117, 125, 359/128, 135, 123, 138, 139, 142, 168; 370/58.1, 85.2, 85.1, 94.1, 60, 60.1; 385/36, 37, 16, 17, 24

[56] References Cited

U.S. PATENT DOCUMENTS

| | | | |
|---|---|---|---|
| 5,091,905 | 2/1992 | Amada | 359/135 |
| 5,093,743 | 3/1992 | Eng et al. | 359/117 |
| 5,194,977 | 3/1993 | Nishio | 359/128 |
| 5,208,691 | 5/1993 | Nishio | 359/117 |
| 5,208,692 | 5/1993 | McMahon | 359/128 |
| 5,241,409 | 8/1993 | Hill et al. | 359/128 |
| 5,303,078 | 4/1994 | Brackett et al. | 370/60.1 |

OTHER PUBLICATIONS

Kai Y. Eng. Mark J. Karol and Y. S. Yeh, "Growable Packet (ATM) Switch Architecture: Design Principles and Applications", International Conference on Communications, Proceedings, pp. 1159–1165, Jun. 1989.

Hitoshi Uematsu, Haruhiko Matsunaga and Hitoshi Obara, "A Cell–Based Cross–Connect Switch For ATM BroadBand Networks", Singapore International Conference on Networks, pp. 1–6, 1989.

B. Bingham, and H. Bussey, "Reservation–Based Contention Resolution Mechanism For Batcher–Banyan Packet Switches", Electronics Letters, vol. 24, No. 13, pp. 772–773, 23rd Jun. 1988.

H. B. Jeon and C. K. Un, "Contention–Based Reservation Protocol In Fibre Optic Local Area Network With Passive Star Topology", Electronics Letters, vol. 26, No. 12, pp. 780–781, 7th Jun. 1990.

Kasra Rastani, T. V. Lakshman and A. Bagchi, "Photonic architecture for scheduling cell–transmission in asynchronous transfer–mode switches", Tuesday Afternoon/OFC'92, pp. 61–62.

*Primary Examiner*—Benedict V. Safourek
*Assistant Examiner*—Dang Ton
*Attorney, Agent, or Firm*—Leonard C. Suchyta; James W. Falk

[57] ABSTRACT

Apparatus and methods are provided for photonic contention resolution in a switch including a plurality of input modules and a plurality of output modules, wherein at least two of the plurality of input modules have cells to be transmitted to a destination output module. The photonic contention resolution device includes a plurality of coherent light sources for emitting a beam of coherent light and a plurality of tunable receivers. Each of the coherent light sources and tunable receivers are tunable by an associated input module to a plurality of distinct wavelengths. Each tunable laser preferably illuminates at least one of the plurality of tunable receivers at the particular wavelength associated with the destination output module such that one of the at least two input modules transmits its cell to the destination output module if none of the plurality of coherent light sources is illuminating its associated tunable receiver at the particular wavelength.

42 Claims, 7 Drawing Sheets

Fig. 4
| | | | | | Arbitration Cycle |
|---|---|---|---|---|---|
| 5 (0) | 8 (0) | 9 (0) | | PHASE 1 | |
| [5] (0) | 8 (1) | 9 (1) | | PHASE 2 | 1 |
| 2 (0) | 5 (0) | 8 (1) | 9 (1) | PHASE 1 | |
| 2 (0) | 5 (0) | [8] (0) | 9 (1) | PHASE 2 | 2 |
| 2 (0) | 5 (0) | 8 (0) | 9 (1) | PHASE 1 | |
| 2 (0) | 5 (0) | 8 (0) | [9] (0) | PHASE 2 | 3 |
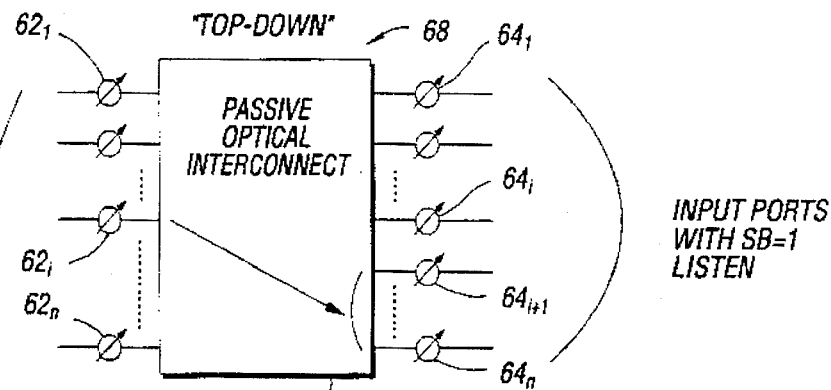
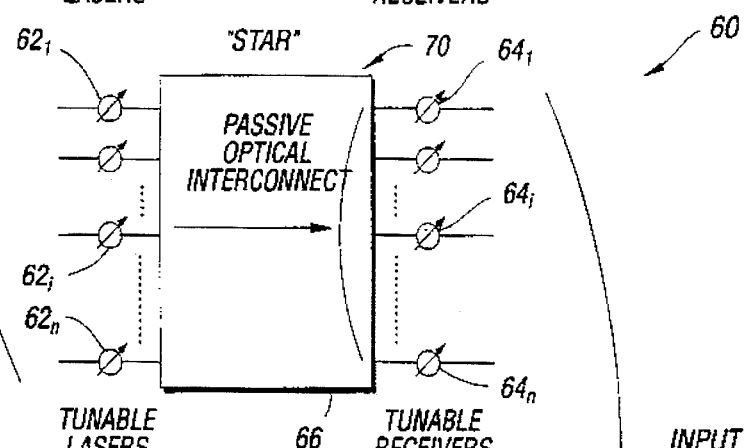
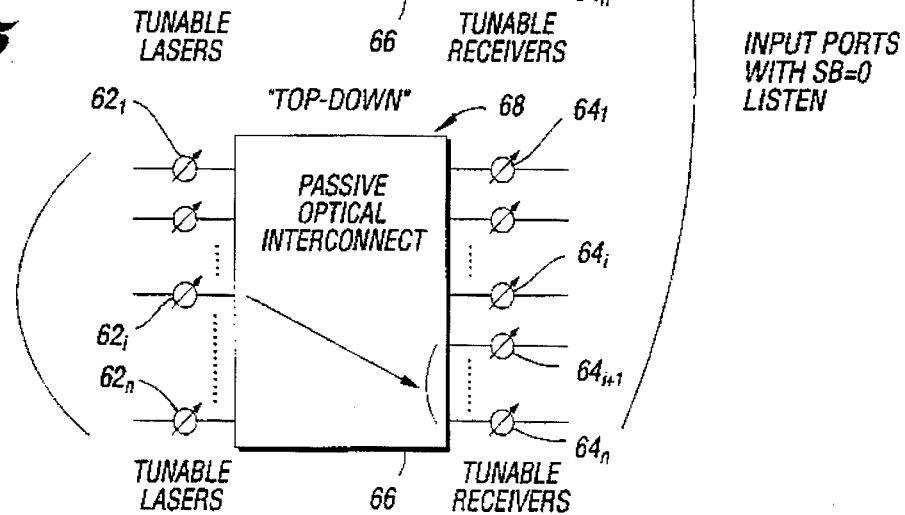
Fig. 5

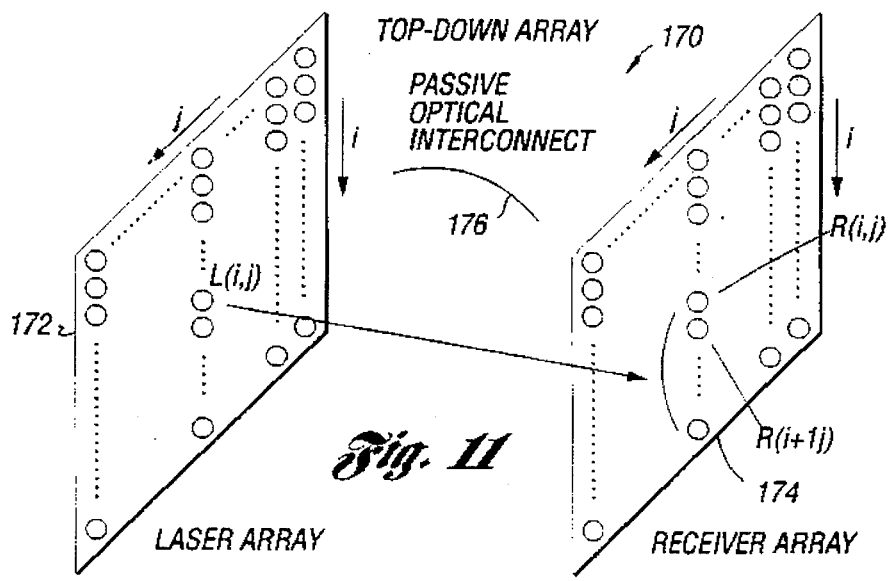
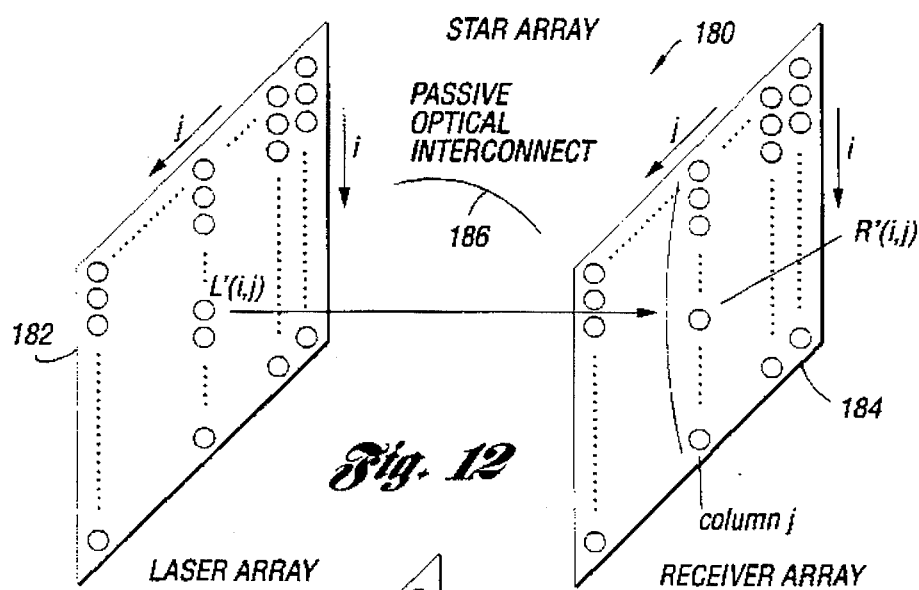
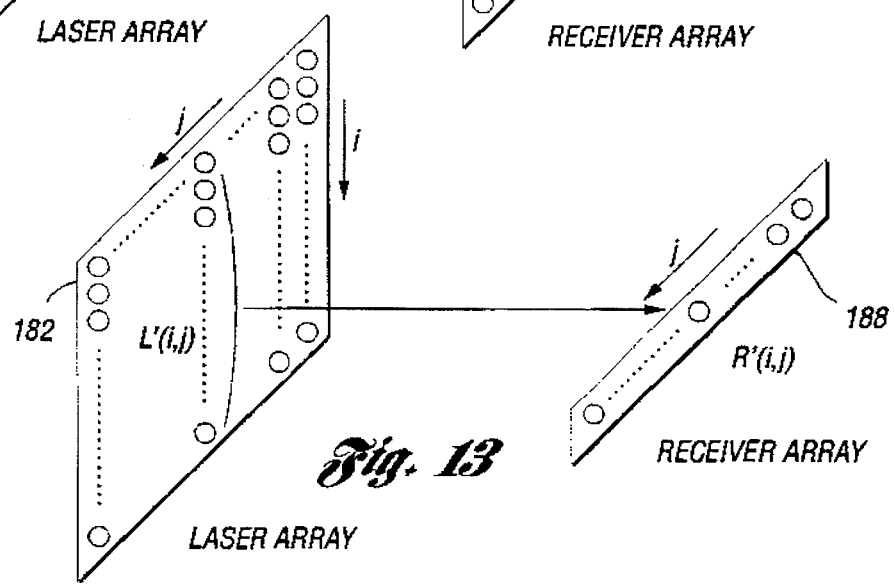

APPARATUS AND METHOD FOR PHOTONIC CONTENTION RESOLUTION IN A LARGE ATM SWITCH

CROSS-REFERENCE TO RELATED APPLICATION

This application is a continuation-in-part of U.S. patent application Ser. No. 629,576, filed Dec. 18, 1990, now U.S. Pat. No. 5,157,654, issued Oct. 20, 1992, to A. Cesnero, and titled "A Technique For Resolving Output Port Contention In A High-Speed Packet Switch," which is hereby expressly incorporated by reference in its entirety.

TECHNICAL FIELD

The present invention relates to apparatus and methods for resolving contentions in a large asynchronous transfer mode (ATM) switch, and more particularly, to apparatus and methods for resolving such contentions photonically.

BACKGROUND ART

Input buffered ATM switches, and some types of switches using a combination of input and output buffering, require a device to resolve output buffer contention. Output buffer contention results when there are more packets destined to an output buffer than the switch can transport in a cell cycle time. In a packet switch, output buffer contention is a result of the non-deterministic nature of packet traffic since traffic to any switch output buffer can come from a number of input buffers. Therefore, some device is needed to arbitrate among the input buffer requests and decide which input buffers will be allowed to transmit a cell through the switch in the next cell cycle time.

There exists a number of contention resolution schemes. One such scheme is disclosed in the above-referenced patent application, which is assigned to the assignee of the present invention, wherein contention is resolved for any incoming ATM cell at the head of queue (HOQ) by comparing the physical output module address with same address for every other ATM cell situated at the HOQ. If two or more cells have the same output module address, contention is resolved according to the relative numerical top-down locations of the specific input buffers for these cells as modified by priority and fairness considerations.

The article titled "A Growable Packet (ATM) Switch Architecture: Design Principles and Applications" authored by Kai Y. Eng, Mark J. Karol and Y. S. Yeh, presented at the International Conference on Communications and published in the Proceedings at pp. 1159–1165, discusses a method to construct large switches based on three principles: a Generalized Knockout Principle which exploits the statistical behavior of packet arrivals to reduce interconnect complexity; output queuing which yields good delay/throughput performance; and distributed intelligence in routing packets to eliminate path conflicts.

The article titled "A Cell-Based Cross-Connect Switch for ATM Broadband Networks." authored by H. Uematsu, H. Matsunaga and H. Obara, presented at the Singapore International Conference on Networks, 1989, discloses a time reservation algorithm for contention resolution in input queuing cross-connect switches for ATM networks. The algorithm represents an advanced version of scheduling control and is implemented utilizing a pipeline technique to provide higher throughput than conventional three-phase algorithms under random traffic.

Another reservation-based contention resolution scheme is described in the article titled "Reservation-Based Contention Resolution Mechanism for Batcher-Banyan Packet Switches", authored by B. Bingham and H. Bussey, published in $Electronics$ $Letters,$ $23^{rd}$ June 1988, Vol. 24, No. 13. The article utilizes a ring-like interconnection of packet switch interfaces to make output port reservations, resulting in a high-performance switch that is compact and reliable.

In the article titled "Contention-Based Reservation Protocol in Fibre Optic Local Area Network With Passive Star Topology" authored by H. B. Jeon and C. K. Un, published in $Electronics$ $Letters,$ $7^{th}$ June 1990, Vol. 26, No. 12, a contention-based reservation protocol utilizing a separate control channel for a fibre optic LAN is discussed. An access protocol is presented which uses an improved reservation scheme that is simple, yields a good delay/throughput characteristic and can be used in any multi-channel network.

The schemes described above, and the other existing schemes, however, are performed electronically. Another method resolves contention photonically, as described in "Photonic Architecture for Scheduling Cell-Transmission in Asynchronous Transfer Mode Switches", authored by K. Rastani, T. V. Lakshman and A. Bagchi, presented at the Optical Fiber Communications Conference, Feb. 2–7, 1992, San Jose, Calif. The authors propose a photonic device based on a graph-coloring scheduling algorithm. A general case, such as where, during a transmission slot, an input port is connected to all its requested output ports or none at all, is considered.

Unlike electronic-based contention resolution, photonic contention resolution is less complex, has fewer problems associated with electromagnetic interference and synchronization, and is faster.

SUMMARY OF THE INVENTION

It is an object of the present invention to provide a contention resolution device (CRD) in which the arbitration function is done photonically.

It is an additional object of the present invention to provide a photonic CRD which can service an ATM switch with a capacity exceeding one terabit per second.

It is yet a further object of the present invention to provide a photonic CRD based on tunable lasers and tunable receivers.

It is yet still a further object of the present invention to provide a photonic CRD which is based on two-dimensional laser and receiver arrays.

In carrying out the above objects and other objects and features of the present invention, an apparatus is provided for photonic contention resolution in a switch including a plurality of input modules and a plurality of output modules, wherein at least two of the plurality of input modules have cells to be transmitted to a destination output module. The photonic contention resolution device includes at least one tunable coherent light source for emitting at least one beam of coherent light associated with each input module. The at least one coherent light source is preferably tunable by an associated input module to a plurality of distinct wavelengths. The device also includes at least one tunable receiver being tunable by an associated input module to a plurality of distinct wavelengths. The at least one coherent light source illuminates the at least one tunable receiver at the particular wavelength associated with the destination output module, such that one of the at least two input modules transmits its cell to the destination output module if none of the beams of coherent light is illuminating its associated tunable receiver at the particular wavelength.

The advantages accruing to the present invention are numerous. For example, a photonic CRD is less complex than an electronic counterpart and is less susceptible to electromagnetic interference.

The above objects and other objects, features, and advantages of the present invention will be readily appreciated from the following detailed description of the best mode for carrying out the invention when taken in connection with the accompanying drawings.

BRIEF DESCRIPTION OF THE DRAWINGS

FIG. 4 is an illustration of contention resolution (i.e. arbitration) performed by the photonic CRD of the present invention utilizing fairness;

FIG. 5 is an illustration of a single-phase photonic CRD of the present invention;

FIG. 11 is an illustration of a photonic CRD of the present invention based on laser arrays which provides top-down contention resolution;

FIG. 12 is an illustration of a photonic CRD based on top-down laser arrays and star laser arrays;

FIG. 13 is an illustration of the photonic CRD of FIG. 12 with a one-dimensional receiver array.

BEST MODE FOR CARRYING OUT THE INVENTION

Figure 1:
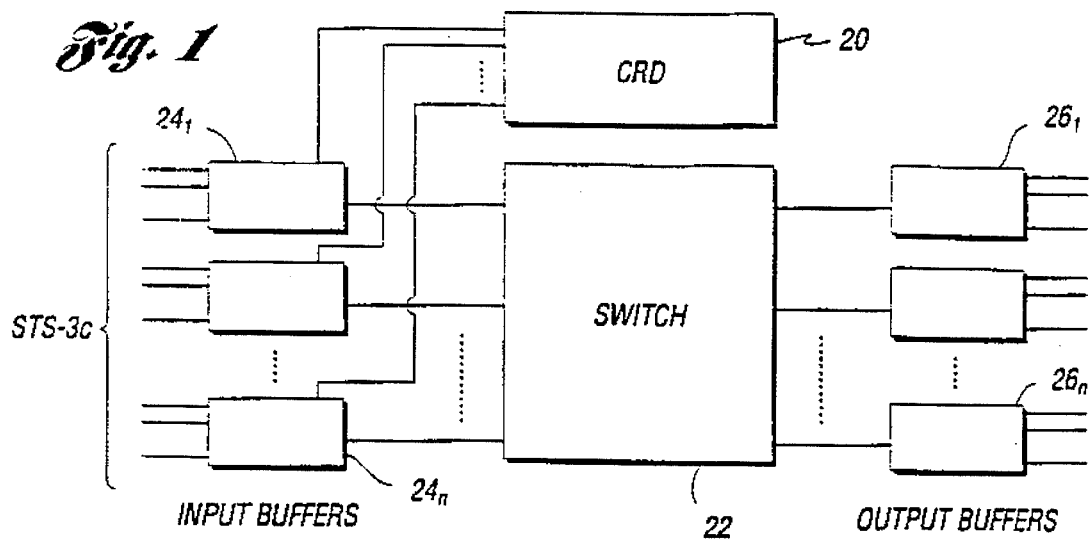
FIG. 1 is a block diagram of a large-scale ATM switch and the photonic contention resolution device (CRD) of the present invention.

Referring now to FIG. 1, there is illustrated a block diagram of the contention resolution device (CRD) of the present invention, shown generally by reference numeral 20, for use with an asynchronous transfer mode (ATM) switch, shown generally by reference numeral 22. As illustrated, the switch 22 receives cells, or packets, from n input buffers 24 and switches them to n output buffers 26.

The input buffers 24 concentrate cells from a number of STS-3c lines (64 or 128, for example) into a single queue. An STS-3c cell cycle time is 2.83 μsec; a concentration factor of 64 reduces the cell cycle time to 44 nS. For n=128, the photonic CRD 20 preferably operates over 128 requests in a few tens of nanoseconds, resulting in a switch 22 having a capacity of about 1 terabit/S. With n=128 and a concentration factor of 64 at the input buffers, the total number of input lines is 8192.

Figure 2:
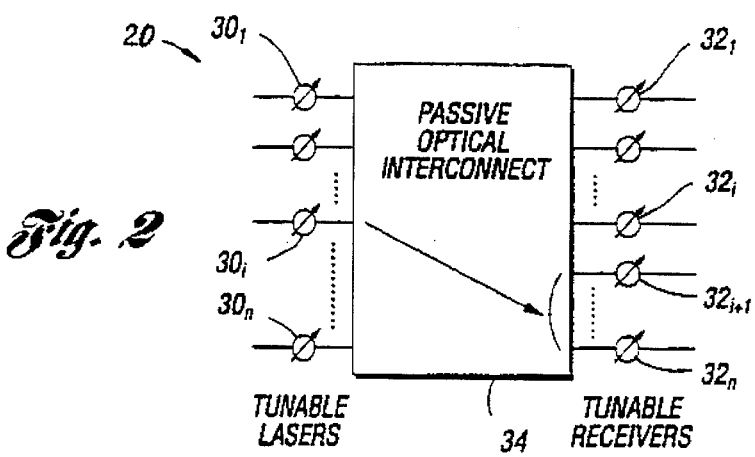
FIG. 2 is a block diagram of the photonic contention resolution device shown in FIG. 1.

Referring now to FIG. 2, there is illustrated a more detailed block diagram of the photonic CRD 20. As shown, the CRD 22 consists of n tunable lasers 30, n tunable receivers 32, and a passive optical interconnect shown generally by reference numeral 34. In the preferred embodiment, the tunable lasers 30 and the tunable receivers 32 are tunable to a set of n wavelengths $\lambda_1, \lambda_2, \ldots, \lambda_n$. The $i^{th}$ input buffer (or buffer) controls an associated $i^{th}$ laser and an associated $i^{th}$ tunable receiver 32. The tunable lasers $30_{1-n}$ illuminate the receivers $32_{1-n}$ by means of the passive optical interconnect 34. Most preferably, tunable laser number $30_i$, for any i, illuminates the receivers $32_i+1, 32_i+2, \ldots, 32_n$. Laser $30_i$, however, does not illuminate receivers $32_1, 32_2, \ldots 32_i$.

With continuing reference to FIGS. 1 and 2, the input buffers 24 make use of the photonic CRD 20 as follows. Each input buffer 24 has a cell at the head of the queue (HOQ) destined to one of the switch output buffers 26. For example, assume that input buffer $24_i$ has a cell destined for output buffer $26_j$. Input buffer $24_i$ will tune both the laser 30 and the receiver 32 it controls to $\lambda_j$. The principle of contention resolution utilized by the photonic CRD 20 is simply that input buffer $24_i$ cannot transmit the cell at the HOQ if the input buffer $24_i$ detects a signal at its receiver $32_i$; otherwise the input buffer $24_i$ is allowed to transmit. Therefore, if tunable receiver $32_i$ detects a signal when it is tuned to $\lambda_j$, at least one of the laser numbers $30_1, 30_2, \ldots, 30_{i-1}$, is tuned to $\lambda_j$. In this case, at least one of the input buffers $24_1, 24_2, \ldots, 24_{i-1}$, is requesting output buffer $26_j$.

In one embodiment, this contention between input buffers is resolved utilizing top-down prioritizing. With top-down priority, the lower numbered input buffers have higher priority, such that input buffer i loses contention to input buffers 1,2, ... i-1. If tunable receiver $32_i$ detects no signal, no higher priority input buffer is requesting output buffer $26_j$. The fact that laser i is illuminating receivers $32_{i+1}, 32_{i+2}, \ldots, 32_n$ at $\lambda_j$ will, therefore, guarantee that no other input buffer (other than input buffer $24_i$) is allowed to transmit a cell for output buffer $26_j$. Of course, this assumes there are no interference and coherence problems associated with tuning multiple lasers to the same wavelength.

Photonic contention resolution can be analogized to contention resolution utilizing token passing, wherein the token is an n-bit word with each bit representing an output buffer. The token is initialized to zero and passed sequentially through the input buffers starting always at input buffer 1. If an input buffer i has a cell for output buffer j, bit number j is changed in the token from 0 to 1, and the input buffer is allowed to transmit. If bit number j was already set to 1 by a lower numbered input buffer, then input buffer i cannot transmit.

The top-down input buffer priority has an inherent unfairness, even if the top-down dividing line is changed at random or changed by one input buffer 24 each arbitration cycle. For example, consider two consecutive input buffers $24_i$ which contend frequently for the same output buffer $26_j$. Assume that input buffer $24_i$ carries 60% of the bandwidth to output buffer $26_j$ and input buffer $24_{i+1}$ carries 10% of the bandwidth to output buffer $26_j$. When these two input buffers contend for output buffer $26_j$, input buffer $24_i$ will beat input buffer $24_{i+1}$ with probability $(n-1)/n$. This is because input buffer $24_{i+1}$ can beat input buffer $24_i$ only if the top-down dividing line is between i and i+1 and the probability of this event is 1/n. In every other position of the dividing line, input buffer $24_i$ will beat input buffer $24_{i+1}$. The 10% of traffic to output buffer $26_j$ which goes through input buffer $24_{i+1}$ will suffer greater delays thereby affecting other traffic. Inverting the top-down priority order each arbitration cycle improves fairness, but does not help in the case of three or more contending input buffers 24.

Two-Phase Photonic CRD With Fairness

Figure 3:
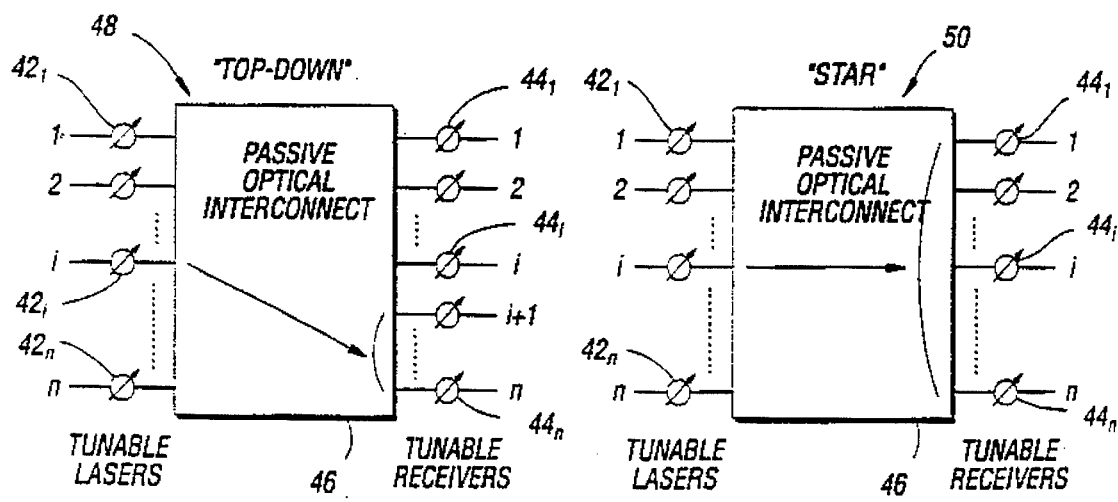
FIG. 3 is a block diagram of the photonic contention resolution device of the present invention, illustrating the tunable lasers and the tunable receivers configured in a top-down plane and a star plane.

With reference now to FIG. 3, there is shown a block diagram of a photonic CRD 40 which allows for fairness of access to output buffers. Preferably, the CRD 40 consists of two sets of tunable lasers 42 and tunable receivers 44 augmented by an electronic status bit (SB) for each input buffer and a passive optical interconnect 46.

The first set of lasers and receivers, labelled as the "top-down" plane shown generally by reference numeral 48, is substantially the same as the lasers 30 and receivers 32 described with reference to FIG. 2, i.e., laser $42_i$ illuminates receivers $44_{i+1}, 44_{i+2}, \ldots 44_n$. The second set labelled the "star" plane shown generally by reference number 50, is preferably interconnected such that each tunable laser 42 illuminates every receiver 44. In one embodiment, the passive optical interconnect 46 of the "star" plane 50 is implemented with an optical star coupler. Preferably, the $i^{th}$ input buffer controls the $i^{th}$ laser and the $i^{th}$ receiver in both the top-down plane and in the star. The $i^{th}$ input buffer also controls the $i^{th}$ status bit.

Operation begins with all status bits initialized to 0. The status bit can be set to 1 under conditions of arbitration loss, as described in greater detail below. A contention resolution cycle is divided into two phases. In phase 1, those input buffers 24 with SB=1, and no others, tune their tunable laser 42 in the star plane 44 to the wavelength associated with the destination output buffer. Those input buffers 24 with SB=0, and no others, tune their tunable receiver 44 in the star plane 44 to the wavelength associated with the destination output buffer 26. Those input buffers 24, among those with SB=0, that sense a signal at their tunable receivers 44 lose arbitration at this point, leave their status bit at "0", and do not participate in phase 2 of this arbitration cycle.

In phase 2, those input buffers 24 with SB=1, and those with SB=0 that did not lose arbitration in phase 1, tune their tunable laser 42 and tunable receiver 44 in the top-down plane 48 to the wavelength associated with the destination output buffer 26. Those input buffers 24 that sense a signal at their tunable receiver 26 lose arbitration and set their status bit to "1". Those buffers that do not sense a signal are the arbitration winners and the status bit is set to "0". Arbitration winners set SB=0.

Referring now to FIG. 4, results of contention resolution with fairness is illustrated. The numbers in parentheses identify the state of the status bit for each input buffer, and arbitration winners are shown in a box. In the first arbitration cycle, input buffers 5, 8 and 9 (i.e. $24_5$, $24_8$ and $24_9$) wish to transmit to output buffer $26j$. If SB(i) is the status bit of buffer i, then SB(5)=0, SB(8)=0 and SB(9)=0 at the start. Since all SB(i)=0, phase 1 of the first arbitration cycle will have no effect. During phase 2 of the first arbitration cycle, input buffer 5 has priority over buffers $24_8$ and $24_9$ and wins arbitration. As a result, SB(5)=0, SB(8)=1 and SB(9)=1.

With continuing reference to FIG. 4, assume now that for the second arbitration cycle, input buffers $24_2$, $24_5$, $24_8$ and $24_9$ wish to transmit to output buffer $26_j$. Thus, SB(2) is initialized to "0" and SB(5)=0, SB(8)=1 and SB(9)=1 from arbitration cycle 1. During phase 1 of the second arbitration cycle, input buffers $24_2$ and $24_5$ lose arbitration and SB(2) and SB(5) remain set to 0. During phase 2, input buffer $24_8$ wins arbitration. As a result SB(8)=0 and SB(9)=1. Now, assume that for the third arbitration cycle input buffers $24_2$, $24_5$, $24_8$ and $24_9$ still wish to transmit to output buffer $26_j$. Thus, SB(2)=0, SB(5)=0, SB(8)=0 and SB(9)=1 from arbitration cycle 2. During phase 1 of the third contention resolution cycle, inputs $24_2$, $24_5$ and $24_8$ lose arbitration and SB(2), SB(5), SB(8), remain at 0. During phase 2, input buffer 249 wins arbitration and SB(9)=0.

As illustrated in FIG. 4, during the first three contention resolution cycles in this example, each of the three input buffers 24 that had a request for output buffer $26_j$ at the beginning of cycle number 1 (i.e. $24_5$, $24_8$ and $24_9$) had exactly one opportunity to transmit to that output buffer. This occurred even when a higher top-down priority input buffer (i.e. $24_2$) had a request for output buffer $26_j$ during arbitration cycles 2 and 3. It should be noted that at the start of the fourth contention resolution cycle (not shown in FIG. 4) all input buffers 24 requesting output buffer $26_j$ will have SB=0. Each of these input buffers 24 will have exactly one opportunity to transmit before any single input buffer has a second opportunity.

Limiting our attention to requests for a given fixed output buffer, this strategy described above groups arbitration cycles into sessions. Each session starts with all status bits set to zero. If there are k input buffers 24 requesting output buffer $26_j$ at the start of a session, each of the k input buffers will get exactly one opportunity to win arbitration in the next k arbitration cycles. Any additional input buffers requesting output buffer $26_j$ after the beginning of the session are forced to wait until the next session starts. Order of access is thus determined by top-down input buffer priority.

Single Phase Photonic CRD

Referring now to FIG. 5, a single phase CRD with fairness is shown generally by reference numeral 60. As illustrated, photonic CRD 60 includes three sets of tunable lasers 62, tunable receivers 64 and passive optical interconnects 66. The first and last sets of lasers 62 and receivers 64 are configured in a top-down plane $68_1$ and $68_2$, respectively. The middle sets are configured as a star plane 70. Thus, photonic CRD 60 is substantially similar to photonic CRD 40, with the addition of a top-down plane. A status bit is associated with each input buffer and, as with the two-phase CRD 40, each input buffer controls the equally numbered lasers and receivers on the three planes.

Those input buffers with SB=1, and no others, tune their tunable lasers 62 in the star plane 70 and in the top-down plane $68_1$ to the wavelength associated with the destination output buffer. Input buffers with SB=1 check for a signal at their tunable receiver 64 in the top-down plane 68 at the same wavelength. Those input buffers with SB=0, and no others, tune their laser in the top-down plane $68_2$ associated with the destination output buffer. Input buffers with SB=0 tune their receiver in the star plane 70 and in the top-down plane $68_2$ to the same wavelength and check for a signal.

In order to explain how contention is resolved, consider the requests for output buffer $26_j$. Requests for different output buffers are entirely independent. If there is a signal at wavelength $\lambda_j$ in the star plane 70, then all input buffers 24 with SB=0 lose arbitration; in this case the activity in the top-down plane $68_2$ is not relevant. This will happen when there is at least one input buffer 24 with SB=1 requesting output buffer $26_j$. All input buffers 24 with SB=0 leave their status bit unchanged. Contention is resolved for those buffers with SB=1 in $68_1$ by the top-down priority strategy previously described. The arbitration winner sets SB=0 and losers leave SB set to "1".

If there is no signal at wavelength $\lambda_j$ in the star plane 70, there are no input buffers 24 with SB=1 requesting output buffer $26_i$ and there is no signal at wavelength $\lambda_j$ in the top-down plane $68_1$ either. Contention is preferably resolved by top-down priority in the top-down plane $68_2$ for those buffers with SB=0 requesting output buffer $26_i$. The winner leaves SB=0 and the losers set SB=1.

Advantageously, it can be seen that this strategy produces the same results as the two-phase strategy, but twice as fast, using the same technology, because it operates in a single phase. The requirement of the hardware associated with the additional top-down plane is, however, a drawback.

In summary, top-down plane $68_1$ is used to resolve contention among input buffers with SB=1. Top-down plane $68_2$ is used to resolve contention among input buffers with SB=0. The star plane 70 is used to force all input buffers with SB=0 to lose contention if there is any input buffer with SB=1 requesting the same output buffer. Input buffers with SB=0 can only be promoted to SB=1 if they lose arbitration in a cycle in which there were no SB=1 input buffers contending for the same output buffer.

Photonic CRD With Fairness And Priority Classes

ATM cells at the input buffers belong to one of p priority classes. Priority levels can take the values 1, 2, ..., p with the lower numbers representing higher priority.

Figure 6:
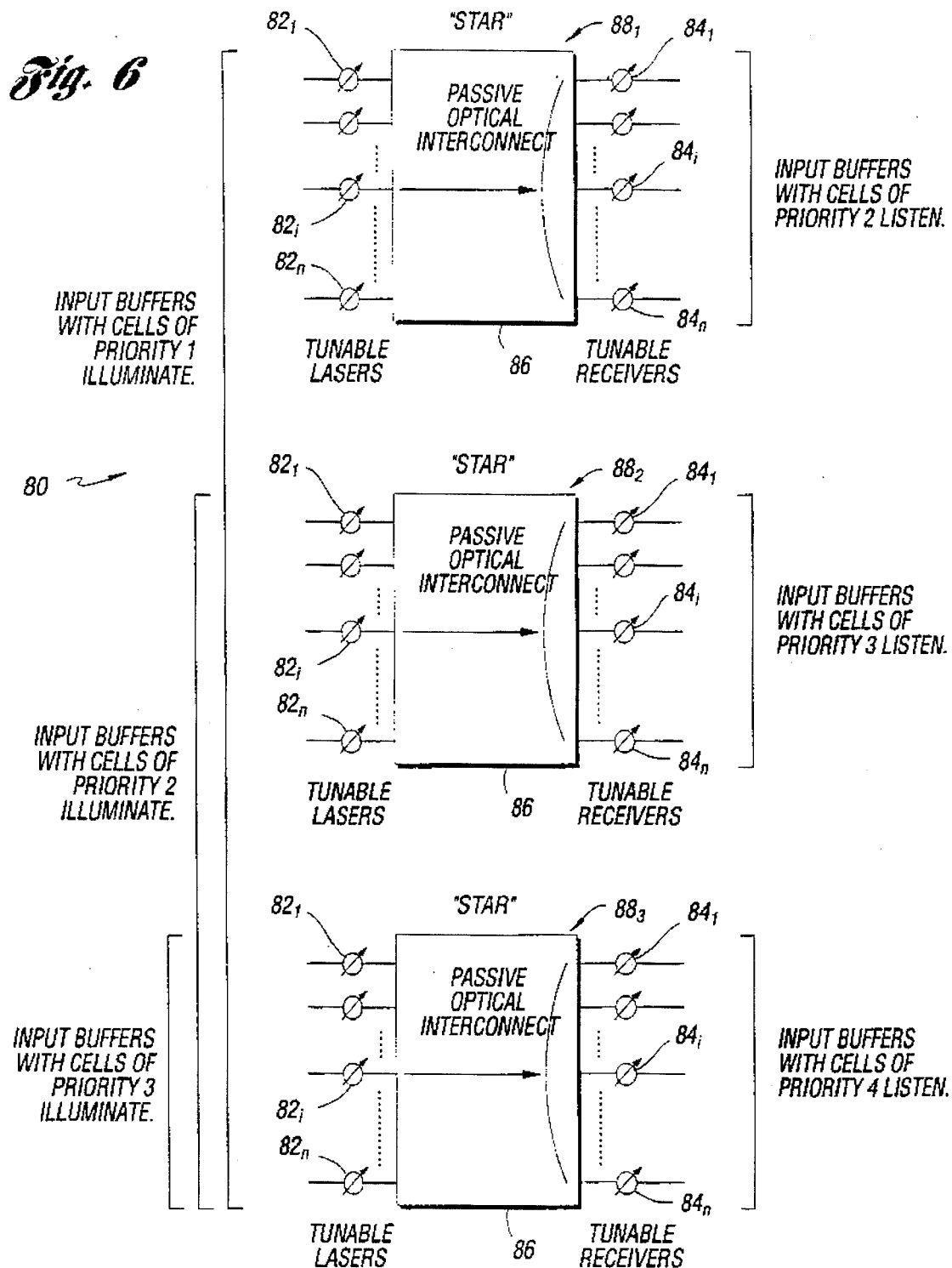
FIG. 6 is an illustration of a two-phase photonic CRD of the present invention which performs priority resolutions.

Referring now to FIG. 6, a two-phase photonic CRD 80 with fairness and priority will be discussed. This CRD includes the components discussed in the previous section (FIG. 5), which will now operate in phase 2, and a number of star planes equal to the number of priority classes minus one (p−1). To be specific, let us assume that p=4. In addition to the hardware components shown in FIG. 5 and a status bit per input buffer (not specifically illustrated), the CRD 80 preferably includes three sets of tunable lasers 82 and tunable receivers 84 which optically communicate through an associated passive optical interconnect configured as "star" planes, shown by reference numerals $88_1$, $88_2$ and $88_3$. Each input buffer 24 controls the equally numbered lasers and receivers of the CRD components shown in FIGS. 5 and 6.

An arbitration cycle is divided into two phases. In the first phase, the star arrays $88_1$, $88_2$ and $88_3$ are used. If input buffer $24_i$ has a cell destined to output buffer $26_j$ with priority class k, input buffer $24_i$ will tune the lasers 82 it controls to $\lambda_j$ in those star planes Sl for which $l \geq k$. In our example, if k=2 the input buffer $24_i$ will turn on the lasers 82 on star planes $88_2$ and $88_3$. If k=4, the input buffer will not turn on any lasers. Input buffer $24_i$ will tune its receivers to $\lambda_j$ on those Sl for which l=k−1. In our example, if k=3, the input buffer will turn on the receivers 84 in star plane $88_2$. If k=1, the input will not tune any of the receivers. Input buffers that detect a signal at their receivers lose contention at this point and do not participate in phase 2. There is no change in the associated status bits. It can be seen that if input buffer $24_i$ senses a signal at $\lambda_j$ there is another input buffer requesting output buffer $26_j$ for a higher priority cell. At the end of phase 1, the requests for any given output buffer that did not lose contention are preferably at the same priority level.

Phase 2 of contention resolution utilizing CRD 80 uses the arrays shown in FIG. 5 and previously described. This phase does not involve priority classes at all, since contention for different output buffers will be among cells of the same priority class. Arbitration for an output buffer is independent of arbitration for another output buffer.

Cell priority takes precedence over the fairness mechanism since all lower priority requests are eliminated in phase 1 before the fairness mechanism operates in phase 2. Fairness has meaning only within a priority class.

In order to build a single phase photonic CRD which includes priority classes, it is necessary to resolve contention among equal priority levels separately and simultaneously. Thus, a set of three arrays, such as that in FIG. 5, should be for each priority class. Additionally, p−1 star arrays, such as stars $88_{1-3}$, should be utilized concurrently with the operation of the top-down arrays. In this case, any input buffers losing contention due to priority disregard the results of contention in the top-down planes and leave their status bits unchanged.

For contention resolution utilizing tunable lasers and tunable receivers, the tunable lasers and tunable receivers are preferably capable of being tuned in 10 to 20 nS over a range of wavelengths that will allow adequate separation of 128 channels, since the preferred arbitration time is about 44 nS. Since a number of lasers are tuned to the same wavelengths, coherent interference is introduced. Tuning accuracy and variation should also be considered. Accordingly, the interconnect methods described above between the lasers and receivers minimize this interference. Light from different sources would strike different parts of the receiver, or interfere in such a way as to produce many fringes over the receiving area. It is also necessary to ensure that there is no significant coupling among lasers tuned to the same wavelength due to light reaching from one to another.

Since several nanoseconds can pass after tuning has stabilized for signal detection, the optical power budget should be quite comfortable even at very low bit error rates (e.g. BER $<10^{12}$). This is suggested from the estimated power budget of wavelength division multiplexing optical star couplers (sized around 128×128) working at much faster speeds (i.e. Gigabits/sec).

Figure 7:
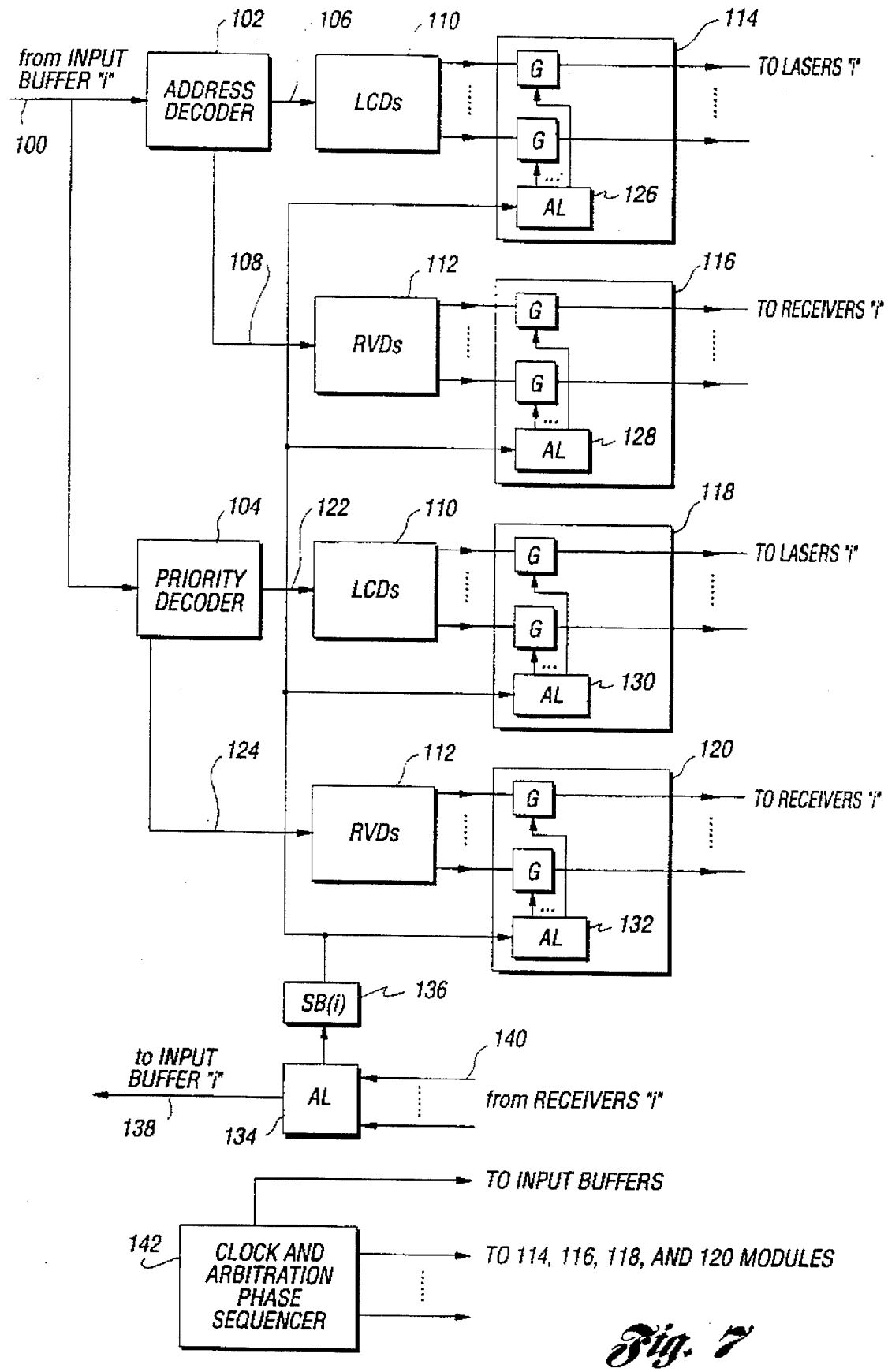
FIG. 7 is a block diagram of the laser driver and arbitration logic for use with photonic contention resolution devices employing tunable lasers and receivers.

Referring now to FIG. 7, there is shown a block diagram for circuitry for driving the tunable lasers and tunable receivers of the photonic contention resolution devices previously discussed and for executing the arbitration algorithm appropriate to the level of complexity desired (i.e. with or without fairness, with or without cell priority levels). The block diagram of FIG. 7 is replicated for each input buffer 24 of the switch (see FIG. 1).

As shown in FIG. 7, input buffer i preferably communicates the address of the destination output buffer desired and the cell priority class to an address decoder 102 and a priority decoder 104 via line 100. The address is stored in the address decoder 102 and the cell priority class is stored in the priority decoder 104.

For each address, the address decoder 102 produces unique voltages output on lines 106 and 108. The laser current drivers (LCDs) 110 convert this voltage to a unique current, which will tune the lasers i to the desired wavelength if the corresponding gates G in the switching module 114 are enabled according to the contention resolution algorithm. The receiver voltage drivers (RVDs) 112 convert the voltage on line 108 to a unique voltage which will tune the filters of the receivers i to the desired wavelength if the corresponding gates G in switching module 116 are enabled according to the contention resolution algorithm.

With continuing reference to FIG. 7, for each priority class, the priority decoder 104 produces unique voltages output on lines 122 and 124. The LCDs 110 convert this voltage to a unique current which will tune the lasers i to the desired wavelength if the corresponding gates G in switching module 118 are enabled according to the contention resolution algorithm. Similarly, the RVDs 112 convert the voltage on line 124 to a unique voltage which will tune the filters of the receivers i to the desired wavelength if the corresponding gates G in module 120 are enabled according to the contention resolution algorithm.

For the less complex embodiments previously described, appropriate modules in FIG. 7 would be omitted. For example, for embodiments without cell priority levels, such as the photonic CRD 22 shown in FIG. 2, the outputs of the gates G in the modules 114 and 116 are in electrical communication with the lasers 30 and the receivers 32, respectively. For embodiments with cell priority levels, such as the photonic CRD of FIG. 80 shown in FIG. 6, the outputs of the gates G in the modules 118 and 120 are in electrical communication with the lasers 82 and the receivers 84, respectively, in the priority stars 88.

In the preferred embodiment, the arbitration logic units 126, 128, 130 and 132 enable or disable the tuning of the lasers and receivers according to the appropriate algorithm depending on the complexity level. The arbitration logic unit 134 sets the status bit SB(i) 136 of the input buffer and provides the arbitration loss or win signal to the input buffer via line 138 depending on the contention resolution algorithm. The results of arbitration depend on the state of the signals from the receivers communicated to the arbitration logic unit 134 via lines shown generally by reference 140. Additionally, a clock and arbitration phase sequencer 142 maintains synchrony of the modules 102, 104, 114, 116, 118, 120 and 134, and provides the arbitration phase start signals.

With continuing reference to FIG. 7, the number of lines emerging from the LCDs 110 and the RVDs 112 depend on the number of lasers and receivers to be driven. The same applies to the lines 140 extending into the arbitration logic unit 134 from the receivers.

Figure 8:
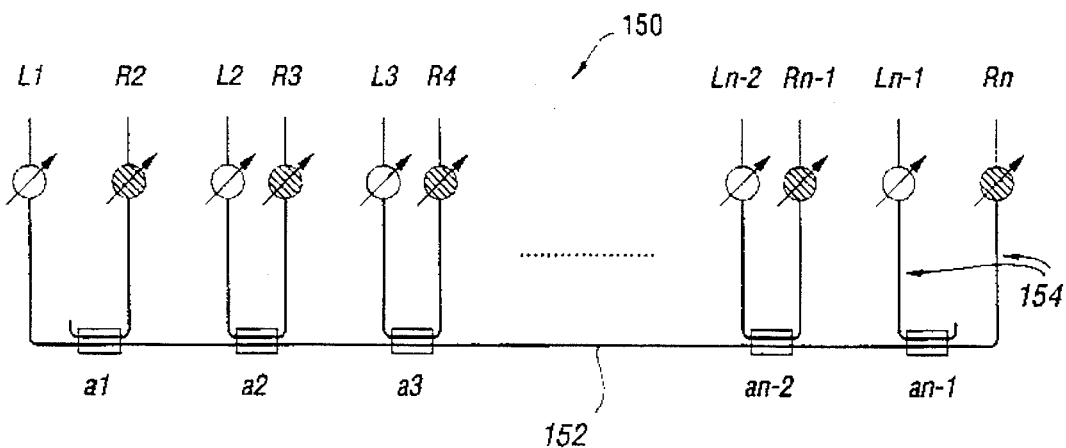
FIG. 8 is an illustration of a photonic CRD based on tunable lasers and tunable receivers interconnected through a passive optical bus with access couplers.

Referring now FIG. 8, there is shown a photonic contention resolution device 150 which utilizes a passive optical interconnect in the form of a passive linear optical bus, shown generally by reference numeral 152. As illustrated, a main optical fiber extends from laser L1 to receiver Rn, and there are (n-1) access couplers a1, a2, ..., a(n-1) on the bus 152. The value of n is determined largely by power budget. In this embodiment, the lasers L1, L2, ..., Ln-1 and the receivers R2, R3, ..., Rn are connected to the block diagram shown in FIG. 7. Note that receiver R1 and laser Ln are not included because they perform no useful function.

Assuming that a photonic CRD has a cycle time of 22 nS (this is 128 times faster than the STS-3c cell cycle time), the receivers will be working at a rate of about 50 Mbit/S. At this bit rate, the sensitivities of direct detection avalanche photodiodes are around −50 dBm, for a bit error rate (BER) of $10^{12}$.

With continuing reference to FIG. 8, assume that the tunable lasers L produce an output, into an optical fiber, of 1 mW. This requires a 50 dB maximum optical power loss between any laser and any receiver downstream from it. Preferably, 2 dB is allowed for connector losses, 3 dB is allowed for filter insertion loss and 5 dB is allowed for a margin. The filters provide tunability before the optical power goes into the receivers. Thus, the total allowance for these types of losses is about 10 dB, which is subtracted from the 50 dB maximum optical power loss, resulting in a 40 dB loss allowance along the optical bus 152 of FIG. 8.

In a simple case, such as where access couplers a2, a3, ..., a(n-2) are equal, couplers a1 and a(n-1) are preferably different from the others, since for these two couplers a very small amount of access loss and maximum transmission along the main fiber is needed. Receiver R2 requires a very small amount of the light from L1. Since there is no receiver connected to a(n-1), this access coupler can also have a very small access loss.

With continued reference to FIG. 8, the access couplers are characterized by an access loss value and a transmission loss value. In the preferred case, if r is the fraction of optical power available to be put in (this is called the access loss), then 1−r is the fraction of power transmitted. Additional losses are incurred by scattering in the access coupler. In the preferred embodiment, about 0.5 dB is allowed for scattering and splice losses for each access coupler. For a given access loss, the transmission loss for purposes of calculations is about 0.5 dB above ideal. For example, for a 3 dB access loss, a transmission loss of 3.5 dB is utilized instead of the ideal 3 dB.

For the very small access losses desirable for access couplers a1 and a(n-1), the transmission loss is dominated by the allowed 0.5 dB excess loss. Assuming access couplers a1 and a(n-1) have 30 dB access loss and 0.5 dB transmission loss, the 40 dB allowance for losses along the bus is now reduced to 39 dB for the transmission loss allowance through a2 to a(n-2) inclusive.

With continuing reference to FIG. 8, for an access loss of A of the couplers a2 to a(n-2) and a transmission loss of T of the couplers a2 to a(n-2), the condition that the total loss from any laser to any receiver downstream is less than 40 dB is satisfied. If this condition is satisfied for the loss between laser L2 and receiver R(n-1), then the condition is also satisfied for any laser-receiver pair between these two.

In the preferred embodiment, the maximum value of n satisfies the inequality $2A+(n-5)T \leq 40$ dB. This inequality simply states that the total loss from L2 to R(n-1) is accounted by two access losses at a2 and a(n-2), and by (n-5) transmission losses at the intermediate access couplers from a3 to a(n-3). Also preferably $(n-3)T \leq 39$ dB is satisfied so as to satisfy the transmission loss from L1 to Rn. However, the maximum value of n that satisfies the first inequality also satisfies the second. The maximum n is 26 for either (A=10 dB, T=0.96 dB) or (A=11 dB, T=0.86 dB).

An additional case to consider is when the value of the access loss of the access couplers is tailored depending on their position along the optical bus 152. This allows a larger number of lasers and receivers to be mounted on the bus 152. Couplers a1 and a(n-1) are chosen as above, but a2, a3, ..., a(n-2) are allowed to vary in access loss so as to maximize n. Starting with access coupler a2, its access loss is preferably chosen such that the optical power on the bus 152, just after access coupler a2, is substantially the same from lasers L1 and L2. Access coupler a3 is preferably chosen so that the optical power on the bus 152, just after access coupler a3, is the same from lasers L1, L2 and L3. Continuing this way with access couplers a4, a5, ... until an accumulated loss is obtained, at access coupler a1, of 20 dB, which is half of the 40 dB allowed on the bus 152. At this point, access coupler a(i+1) is chosen like a1, a(i+2) like a(i−1), a(i+3) like a(i−2), and the like. For our example of 40 dB loss along the bus 152, it is possible to have n=45, which is considerably larger than the n=26 obtained for an optical bus which utilizes identical access couplers.

The tuning speeds required for the photonic contention resolution devices described herein have been demonstrated for 3-section distributed Bragg reflector type tunable lasers, and are in the range of 10 to 20 nS. However, tuning speeds of fiber Fabry-Perot filters used at the receiving end are still in the several mS range. For this design to be practical in very high capacity packet switching applications, improvements in filter tunability speeds are required.

Figure 9:
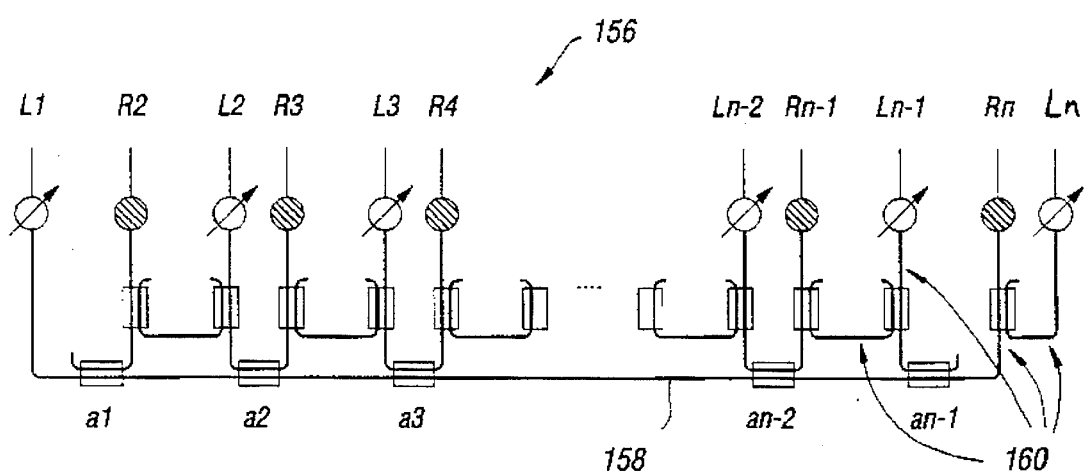
FIG. 9 is an illustration of a photonic CRD based on tunable lasers and heterodyne receivers interconnected through a passive optical bus with access couplers.

Referring now to FIG. 9, there is illustrated a photonic CRD 156 which avoids the use of tunable filters. Operation of the CRD preferably utilizes equally numbered lasers and receivers that are tuned to the same wavelength. Instead of using a tunable filter to make a tunable receiver, coherent detection can be utilized, tapping some of the light from laser Li as an input reference beam (i.e. a local oscillator) for receiver Ri.

The photonic CRD 156 is based on an optical bus 158, as with the CRD 150 shown in FIG. 8, with additional access couplers to provide the reference signal for the heterodyne receivers R2, R3, . . . , Rn. In the preferred embodiment, there is an access coupler tapping some of the light from Li and delivered through the optical fiber 160 and another access coupler for mixing with the signal just before receiver Ri.

The function of receivers R2, R3, . . . ,Rn and the associated interconnect shown in FIGS. 8 and 9 is to perform a logical OR operation over the signals from the lasers with a lower index. When Li and Ri are tuned to $\lambda_j$, Ri preferably detects the signal from those lasers Lk (for k<i) that are also tuned to $\lambda_j$. Interference effects that would nullify the function expected should be avoided. For example, when lasers L3 and L7 and receiver R9 are tuned to $\lambda_j$, there could be complete cancellation of the light amplitudes from the two lasers at R9. One way to eliminate this possibility would be to use lasers with sufficiently wide linewidths, while allowing sufficient tuning range. As previously discussed, the preferred contention resolution cycle time is 22 nS. If 10 nS is allowed for detection time interval, interference effects can be avoided if the coherence time of the laser light is, for example, about 10 times smaller that the detection time. For a coherence time of 1 nS, the laser linewidth would have to be about 500 MHz. This is too wide for the tunable laser types discussed above, since linewidths of tunable DBR lasers are typically smaller than 50 MHz. Larger linewidth can be obtained with a reduced lasing cavity, but there is a point beyond which laser action will cease.

An alternate approach that will completely avoid interference effects is available. DBF lasers can be tuned reproducibly within 100 MHz of a target wavelength. This tuning accuracy, coupled with the fact that the linewidth is smaller than 50 MHz, allows the tuning range of the lasers to be subdivided.

Figure 10:
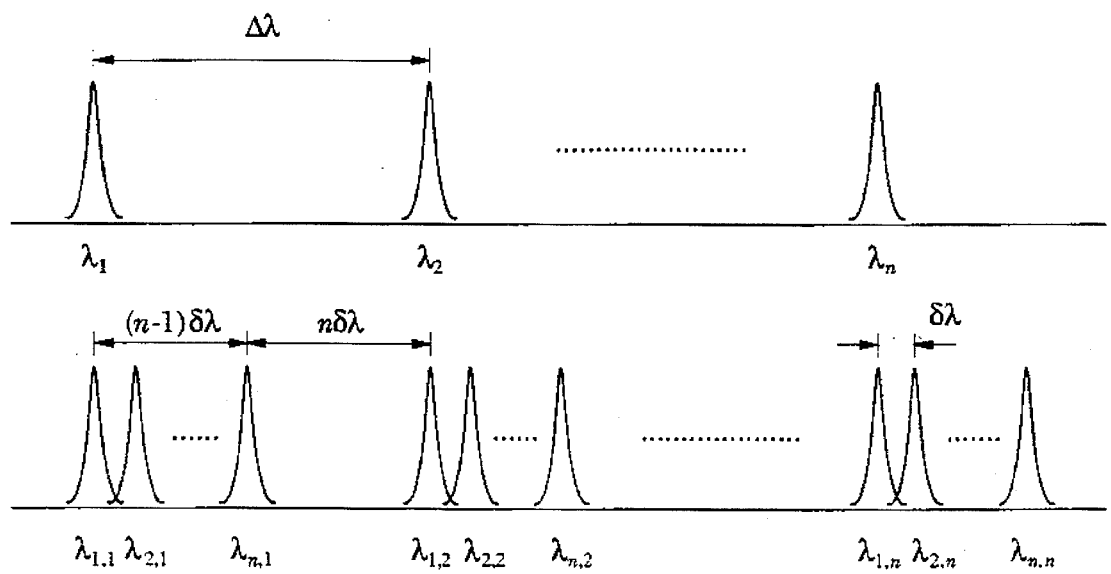
FIG. 10 is an illustration of the subdivision of a laser tuning range to avoid the possibility of destructive interference.

With reference now to FIG. 10, each $\lambda_j$ in $(\lambda_1, \lambda_2, \ldots \lambda_n)$ and can be split it into $\lambda_{1j}, \lambda_{2j}, \ldots, \lambda_{nj}$. Assuming $\delta\lambda = \lambda_{i+1,j} - \lambda_{ij}$ for any j and $\Delta\lambda = \lambda_{ij+1} - \lambda_{ij}$ for any i, then $\Delta\lambda$ is larger than $(2n-1) \delta\lambda$, as described in greater detail below.

The photonic CRD 156 shown in FIG. 9 can now be operated in the following way. Laser Li will tune only to the wavelength subset $\lambda_{i,1}, \lambda_{i,2}, \ldots, \lambda_{i,n}$. When lasers Li and Lk are tuned to the "same" wavelength $\lambda_j$, Li will be tuned to $\lambda_{ij}$, and Lk will be tuned to $\lambda_{kj}$. The CRD of FIG. 9 preferably uses heterodyne detection with Li providing a reference signal at wavelength $\lambda_j$, for Ri. The receiver will have a filter to exclude frequencies above that corresponding to the wavelength difference $\lambda_{i,n} - \lambda_{i,1}$ or $(n-1)\delta\lambda$. Preferably, the signal resulting from mixing with the nearest wavelength with different j value is excluded. This requires a spacing of at least $n\delta\lambda$ between $\lambda_{n,j}$ and $\lambda_{1,j+1}$, as shown in FIG. 10. The spacing between $\lambda_{i,j+1}$ and $\lambda_{i,j}$ is preferably at least $(2n-1) \Delta\lambda$.

Tunable lasers having an 11 nm tuning range have been demonstrated. This wavelength range centered at 1.55 microns provides a frequency range of about $1.4 \times 10^{12}$ Hz. For $\delta\lambda$ equivalent to 250 MHz, $1.4 \times 10^{12}$ Hz is equal to 5600 $\delta\lambda$. A spacing of about 250 MHz is allowed because of the tuning accuracy of 100 MHz. To determine the largest n allowed, the full wavelength range, which is $2n(n-1) \delta\lambda$, is set equal to 5600 $\delta\lambda$. This gives n=53 as the largest allowed by wavelength spacing requirements. Note that, in contrast to communication channel separation problems, crosstalk among the signals at wavelengths $\lambda_{1,j}, \lambda_{2,j}, \ldots, \lambda_{n,j}$ is not a concern. The spacings are to avoid destructive interference only.

The maximum value of n allowed by wavelength spacing requirements (i.e. n=53) is comparable to the maximum value allowed by power budget requirements (i.e. n=45). Accordingly, a photonic CRD can be manufactured that can resolve 45 requests/22 nS=2.0 requests/nS, and can serve an ATM switch with a capacity of 5760 STS-3c lines. By comparison, the limit of what is achievable with CMOS devices is 128 requests/22 nS=5.8 requests/nS. Although this is about 3 times larger than the estimate for photonic contention resolution devices discussed above, photonic device technology is improving much more rapidly than electronic technology.

A Photonic CRD Based on Laser Arrays

Referring now to FIGS. 11 and 12, there are shown photonic contention resolution devices which utilize laser arrays instead of tunable lasers and tunable receivers. As shown FIGS. 11 and 12, one design requires a two-dimensional fixed wavelength laser array, a two-dimensional receiver array and a passive optical interconnect. In order to service an n×n switch, a laser array-based CRD includes an n×n, two-dimensional fixed wavelength laser array a two-dimensional n×n receiver array and a passive optical interconnect. The passive optical interconnect could be implemented as a volume hologram grating.

With reference now to FIG. 11, there is illustrated a photonic CRD 170 which includes a laser array 172, a receiver array 174 and a passive optical interconnect shown generally by reference numeral 176. As illustrated, each laser in the laser array is designated L(i,j), for any i,j from 1 to n, and preferably illuminates receivers R(i+1,j) , R(i+2,j), . . . , R(n,j) with a beam of-coherent light. Laser L(i,j) does not illuminate receivers R(1,j), R(2,j), . . . , R(i,j). Lasers on column j do not illuminate any receivers on columns j' for j≠j'. An array with such an illumination scheme is referred to as a top-down array.

With continuing reference to FIG. 11, input buffer 24$_i$ (previously shown in FIG. 1) controls lasers L(i,1), L(i,2), . . , L(i,n) and receivers R(i,1), R(i,2), . . . , R(i,n)—the lasers and receivers on row i. The operation of such a contention resolution device is analogous to that of the tunable laser CRD with tunability replaced with an additional space dimension. Assume that input buffer $24_i$ has a cell destined for output buffer $26_j$. Input buffer $24_i$ will illuminate laser L(i,j), and leave lasers L(i,j') for j'≠j off. The principle of contention resolution is that input buffer i cannot transmit if a signal is detected at receiver R(i,j). If the input buffer $24_i$ detects no signal at this receiver, then the buffer is allowed to transmit the cell at HOQ to the destination buffer. The reasons this resolves contention are entirely analogous to those previously discussed with reference to the tunable laser CRD 20. This provides simple top-down contention resolution.

A Photonic CRD Based On Laser Arrays With Fairness

With reference now to FIG. 12, there is illustrated a photonic CRD which includes fairness of access, shown generally by reference numeral 180. In the preferred embodiment, the CRD 180 includes two sets of laser and receiver arrays. The first set of laser and receiver arrays is the top-down array of FIG. 11. The second set, shown in FIG. 12, is a star array, which includes an n×n laser array L'(i,j) 182 and an n×n receiver array R'(i,j) 184. In the star array 182, the lasers illuminate receivers through a fixed passive optical interconnect shown generally by reference numeral 186. For any i and j, laser L'(i,j) illuminates receivers R'(i,j), R'(2j), . . . , R'(n,j). That is, a laser L' illuminates all of the receivers on the corresponding column Laser L' however does not illuminate receivers on other columns.

Operation of the CRD 180 is analogous to that of the two plane tunable laser and has two phases. Operation begins with all status bits initialized to 0. The status bit can be set to 1 under conditions of arbitration loss as described in greater detail below. In phase 1, those input buffers with SB=1, and no others, turn on laser L'(i,j) in the star array 182, where j is the output buffer number requested by input buffer i. Those input buffers with SB=0, and no others, check for a signal at receiver R'(k, 1), where 1 is the output buffer number requested by input buffer k. Those input buffers, among those with SB=0, that see a signal at receiver R'(k, 1) lose arbitration at this point, leave their status bit at 0, and do not participate in phase 2 of this arbitration cycle.

In phase 2, those input buffers with SB=1, and those with SB=0 that did not lose arbitration in phase 1, turn on laser L(i,j) and check for a signal at receiver R(i,j), wherein j is the output buffer number requested by input buffer i. Those input buffers that see a signal at R(i,j) lose arbitration and set their status bit to 1. Those buffers that do not see a signal are the arbitration winners, and the status bit is set to zero. CRD 180 thus produces substantially the same results as the two plane tunable laser CRD 40 device previously described.

Referring now to FIG. 13, there is illustrated a star array which does not require a two-dimensional array of receivers. In this embodiment, the CRD utilizes an n×n laser array L'(i,j) 182 as before, but there is a single row of receivers R'(j) shown by reference numeral 188. Lasers L'(i,j) for i=1,2, . . . , n illuminate receiver R'(j). That is, a receiver is illuminated by any laser on the corresponding column. This will provide the same function of the receiver array R'(i,j) shown in FIG. 12. It is only necessary to make the signal detection status of receiver R'(j) available to all input buffers. This simplification is possible because during phase 1 of an arbitration cycle all R'(i,j) in FIG. 12 (for i=1,2, . . . , n and fixed j) are in the same state of signal detection or no-detection. The source of the detected signal is of no relevance.

A Photonic CRD Based On Laser Arrays For Multicast Switches

The laser array CRD 170 that uses the top-down array, previously described and shown in FIG. 11, can be used to resolve contention for multicast switches. These switches can transmit copies of one cell from any input buffer to any subset of the output buffers. The output buffers can receive only one cell in each cell cycle time. Assuming that input buffer $24_i$ (previously shown in FIG. 1) has a cell to be multicast to output buffers 26j1, 26j2, . . . , 26jm. Input buffer 24i turns on lasers L(i,j1), L(i,j2), . . . , L (i,jm) and will leave other lasers on row i off. The input buffer 24i checks for a signal at receivers R(i,j1), R(i,j2), . . . , R(i,jm). If the buffer sees a signal at any of these receivers, the input buffer cannot transmit to the corresponding output buffer. However, the request can be partially satisfied if no signal is seen at some of the receivers; transmission is permitted to the corresponding output buffers. The unsatisfied requests can be retried in the next arbitration cycle. This has been termed call splitting.

Fairness of access to output buffers can be implemented with a CRD that uses a top-down array and a star array, as described with reference to CRD 180 of FIG. 12. One status bit for each input buffer is insufficient. Preferably, there are n status bits for each input buffer. SB(i,j) is the status bit for input buffer i which will determine the arbitration loss state of requests for output buffer j. The operation of the CRD for a multicast switch is analogous to the two-phase CRD shown in FIGS. 11 and 12, expanded to include multiple requests. In addition, the setting of the status bits is output buffer specific. SB(i,j) can be set to 1 only when input buffer i loses contention for output buffer j at the end of phase 2. SB(i,j) is set to 0 whenever input buffer i wins arbitration for output buffer j. There are preferably no status bit changes during phase 1 of an arbitration cycle.

Figure 14:
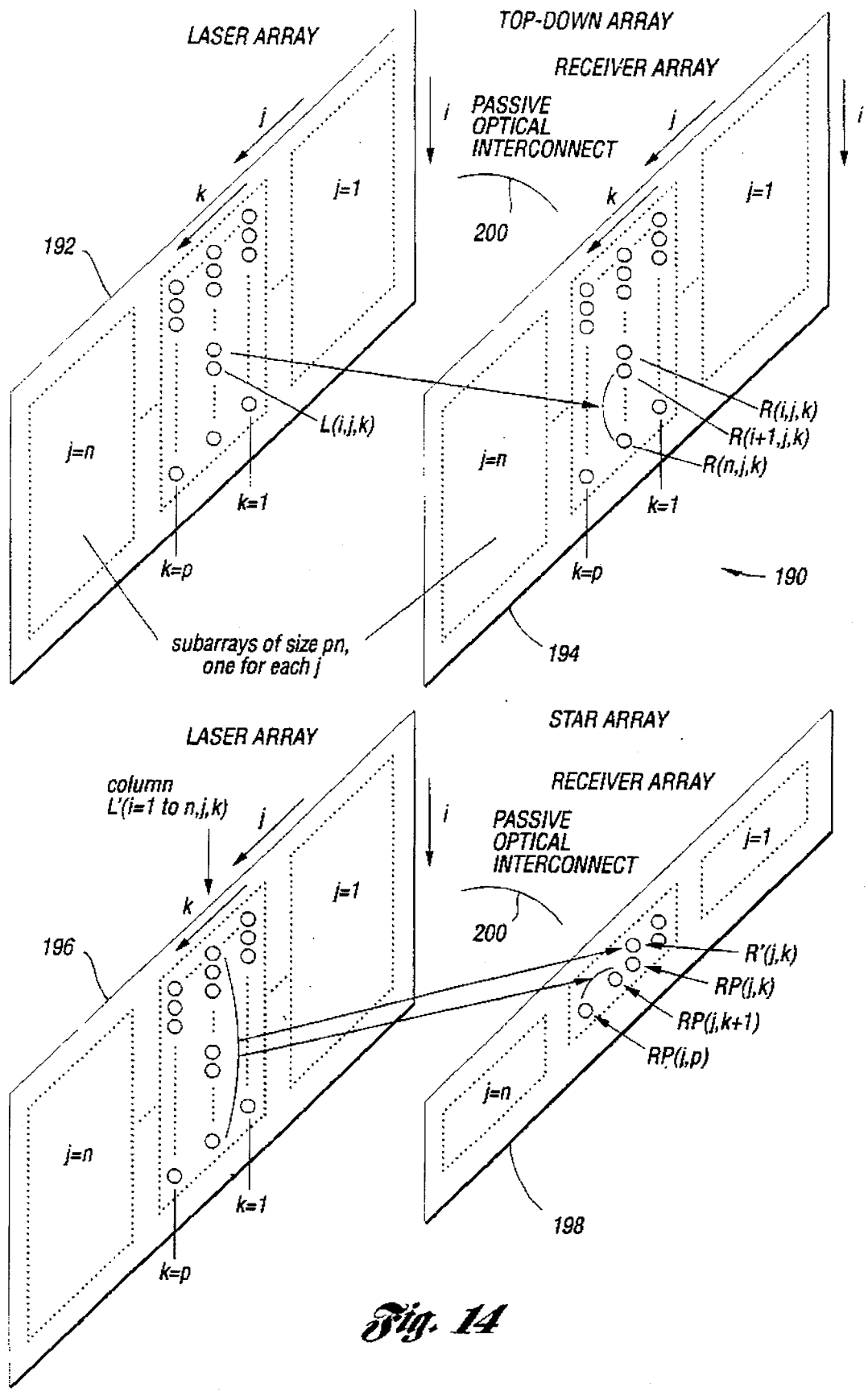
FIG. 14 is an illustration of a photonic CRD of the present invention based on laser arrays which includes priority classes and fairness.

A Photonic CRD Based On Laser Arrays Including Priority Classes and Fairness Referring now to FIGS. 14, there is illustrated a photonic CRD shown generally by reference numeral 190, based on laser arrays and including both priority classes and fairness. In this embodiment, the CRD 190 includes a first laser array 192 and receiver array 194 set, arranged as a top-down array. A second laser array 196 and a receiver array 198 set are arranged as a star array. The individual lasers of the laser arrays 192 and 196 emit beams of coherent light. The CRD 190 also includes a passive optical interconnect shown generally by reference numeral 200 for transmitting the beams of coherent light from the laser arrays to the respective receiver arrays.

With continuing reference to FIG. 14, if there are p cell priority classes, the size of the laser array 192 and the receiver array 194 of the top-down array is n×(pn). As illustrated, lasers and receivers are designated by L(i,j,k) and R(i,j,k), respectively, i, j=1, 2, . . . , n, k=1, 2, . . . , p. Preferably, the size of the laser array 196 in the star array is n× (pn) and the size of the receiver array 198 is 2×(pn). In the star array, lasers are designated by L'(i,j,k) for i, j=1, 2, . . . , n, k=1, 2, . . . , p and receivers are designated by R'(j,k) for the top row and RP(j,k) for the bottom row, j=1, 2, . . . , n, k=1, 2, . . . , p. There is a status bit SB(i) for each input buffer.

With continuing reference to FIG. 14, in the top-down array, laser L(i,j,k) for any (i,j,k) illuminates receivers R(i+1,j,k), R(i+2,j,k), . . . , R(n,j,k), but does not illuminate receivers $R(1,j,k), R(2,j,k), \ldots, R(i,j,k)$. Lasers on a column (i.e. fixed j and k) only illuminate receivers on the corresponding column. In the star array, every laser on a column $L'(1,j,k), L'(2,j,k), \ldots, L'(n,j,k)$ (i.e. fixed j and k) illuminates receiver $R'(j,k)$ and no other receivers on the top row. Every laser on a column (i.e. any fixed j and k) illuminates receives $RP(j,k+1), RP(j,k+2), \ldots, RP(j,p)$ of the bottom receiver row and no others on this row.

Input buffer $24_i$ preferably controls lasers $L(i,j,k)$, $L'(i,j,k)$ and receivers $R(i,j,k)$ for j=1, 2, n, k=1, 2, ..., p. Input buffer $24_i$ controls status bit SB(i) and can consult the signal detection status of any receiver $R'(j,k)$ and any receiver $RP(j,k)$ for all j and k.

Operation of the CRD 190 is divided into two phases. When the device is first turned on, all status bits are initialized to 0. The status bit can be set to 1 under conditions of arbitration loss, as described below. In phase 1, those input buffers with SB=1, and no others, turn on laser $L'(i,j,k)$ where j is the output buffer number requested by input buffer i and k is the cell priority class. Those input buffers with SB=0 check for a signal at receiver $R'(j,k)$, where j is the output buffer number requested and k in the cell priority class. Those input buffers that see a signal at this R' lose arbitration at this point and leave their status bit set to 0. This action will result in fairness of access to output buffers, as previously described with reference to CRD 40. However, fairness will have meaning only within a fixed priority class. As described below, higher priority cells can always win arbitration over lower priority cells, regardless of how long the lower priority cells have waited.

With continuing reference to FIG. 14, in phase 2, the top-down array will be used and the star array will be used again, such that the actions will proceed in parallel. Those input buffers with SB=1 and those with SB=0 that did not lose arbitration in phase 1 turn on lasers $L(i,j,k)$ and $L'(i,j,k)$ where j is the output buffer number requested by input buffer i and k in the cell priority class. These same input buffers check for a signal at receiver $R(i,j,k)$ and receiver $RP(j,k)$. If input buffer $24_i$ senses a signal at any one of these two receivers, the buffer loses arbitration. Arbitration losers that detect no signal at $RP(j,k)$ set status bit SB(i) to 1. If input buffer $24_i$ detects no signal at $R(i,j,k)$ and no signal at $RP(j,k)$ then the buffer wins arbitration and sets status bit SB(i) to 1.

If input buffer $24_i$ sees a signal at $RP(j,k)$, another input buffer is requesting the same output buffer 26j for a cell of higher priority k'>k and input buffer $24_i$ loses contention. If input buffer $24_i$ sees a signal at $R(i,j,k)$, the buffer loses arbitration due to top-down input buffer priority.

A Photonic CRD Based On Laser Arrays For Multicast Switches Including Priority Classes And Fairness As previously described, the CRD 190 can service a multicast switch, so long as there is an n×n array of status bits SB(i,j) so that each input buffer (i) will have a separate status bit for each output buffer j. Assume that input buffer i has a cell, of priority class k, to be multicast to output buffers j1, j2, ..., jm. Each of these m requests is treated independently of each other. Operation is as previously described, with multiple requests by an input buffer treated independently but simultaneously. This can be done since in the operation of the CRD, there is no interdependence among requests for different output buffers, it does not matter that they come from the same input buffer. A multiple request can be partially satisfied. Unsatisfied requests are retried during the next arbitration cycle.

For contention resolution utilizing laser arrays and receivers, addressability of individual lasers and receivers and laser beam separation are factors that should be considered. Additionally, the passive optical interconnect should be capable of delivering adequate power to the receivers.

In summary, apparatus and methods have been presented for photonically resolving contention in a large packet switch. Arbitration can be accomplished in a single parallel operation, or in two sets of parallel operations for the two phase devices, such that an ATM switch of more than one terabit/S in capacity can be serviced.

One of the advantages of photonic contention resolution is a relaxation of the bit level synchronization required for delivering data from the input buffers associated with an electronic CRD. Although some synchronization may be necessary, it is much less stringent than that associated with electronic contention resolution devices. Additionally, overall complexity is reduced, reliability may be improved and problems associated with electromagnetic interference and synchronization are eased.

The reference to the use of photonic contention resolution in an ATM switch is for illustrative purposes. One skilled in the art will appreciate that photonic contention resolution devices such as those described herein could also be utilized to resolve contention between resources. For example, a photonic CRD could serve n requestors contending for m resources, such as memory banks, or the like.

It is to be understood, of course, that while the forms of the invention described above constitute the preferred embodiments of the invention, the preceding description is not intended to illustrate all possible forms thereof. It is also to be understood that the words used are words of description, rather than limitation, and that various changes may be made without departing from the spirit and scope of the invention, which should be construed according to the following claims.

What is claimed is:

1. An apparatus for photonic contention resolution in a switch including a plurality of input modules and a plurality of output modules, each of the output modules being associated with a particular wavelength, at least two of the plurality of input modules having cells to be transmitted to a destination output module, the photonic contention resolution apparatus comprising:

a plurality of coherent light sources for emitting beams of coherent light, each of the sources being tunable by an associated input module to a plurality of distinct wavelengths;

a plurality of tunable receivers, each of the receivers being tunable by an associated input module to a plurality of distinct wavelengths, wherein each tunable light source illuminates at least one of the plurality of tunable receivers at the particular wavelength associated with the destination output module; and means responsive to said receivers for providing a control signal to one of the at least two input modules to transmit its cell to the destination output module if none of the plurality of coherent light sources is illuminating its associated tunable receiver at the particular wavelength.

2. The apparatus of claim 1 further comprising a passive optical interconnect for transmitting said beams of coherent light from said coherent light sources to said tunable receivers.

3. The apparatus of claim 2 wherein the passive optical interconnect is a linear optical bus, the interconnect including a plurality of access couplers positioned along the bus for optically coupling the tunable light sources and the tunable receivers.

4. The apparatus of claim 2 wherein the coherent light sources are tunable lasers.

5. The apparatus of claim 4 wherein there is a plurality of said tunable lasers and a plurality n of said tunable receivers, and wherein a particular tunable laser numbered i only illuminates said tunable receivers numbered i+1, i+2, . . . , n.

6. An apparatus for photonic contention resolution in a switch including a plurality of input modules and a plurality of output modules, each of the output modules being associated with a particular wavelength, at least two of the plurality of input modules having cells to be transmitted to a destination output module, the photonic contention apparatus comprising:

a first plurality of coherent light sources and tunable receivers, each of the sources and receivers being tunable by an associated input module to a plurality of distinct wavelengths in a first phase of operation;

a second plurality of coherent light sources and tunable receivers, each of the sources and receivers of said second plurality being tunable by an associated input module to a plurality of distinct wavelengths in a second phase of operation, each coherent light source of said second plurality illuminating at least one tunable receiver with a beam of coherent light at the particular wavelength associated with the destination output module during each of said phases of operation; and means responsive to said tunable receivers for generating a control signal to cause one of the at least two input modules to transmit its cell to the destination output module if none of the first and second pluralities of sources is illuminating the tunable receivers associated with said one input module at said particular wavelength during either phase of operation.

7. The apparatus of claim 6 further comprising means for providing an electronic status bit associated with each of the plurality of input modules, the value of the status bit determining which of the coherent light sources of said first and second pluralities illuminates at least one tunable receiver during each of said phases of operation, each of said input modules controlling the value of an associated status bit to indicate illumination of an associated tunable receiver at the particular wavelength by another coherent light source.

8. The apparatus of claim 6 wherein the coherent light sources of said first and second plurality are tunable lasers.

9. The apparatus of claim 8 wherein the tunable lasers and tunable receivers of said first plurality include a plurality n of said tunable lasers and a plurality n of said tunable receivers, and wherein a particular tunable laser numbered i only illuminates tunable receivers numbered i+1, i+2, . . . n.

10. The apparatus of claim 8 wherein the tunable lasers and tunable receivers of said second plurality include n tunable lasers and n tunable receivers, tunable laser i illuminating every tunable receiver.

11. The apparatus of claim 9 further comprising a pair of passive optical interconnects associated with the tunable lasers and tunable receivers of said first and second plurality for transmitting the beams of coherent light from the tunable lasers to the tunable receivers of said first and second plurality during both phases of operation.

12. The apparatus of claim 11 wherein each of said passive optical interconnects is a linear optical bus, each of said interconnects including a plurality of access couplers positioned along the bus for optically coupling the tunable lasers and the tunable receivers associated therewith.

13. An apparatus for photonic contention resolution in a switch including a plurality of input modules and a plurality of output modules, each of the output modules being associated with a particular wavelength, at least two of the plurality of input modules having cells to be transmitted to a destination output module, the photonic contention resolution apparatus comprising:

a first plurality of sources for emitting beams of coherent light and tunable receivers, each of the sources and receivers of said first plurality being tunable by an associated input module to a plurality of distinct wavelengths;

a second plurality of sources for emitting beams of coherent light and tunable receivers, each of the sources and receivers of said second plurality being tunable by an associated input module to a plurality of distinct wavelengths;

a third plurality of sources for emitting beams of coherent light and tunable receivers, each of the sources and receivers of said third plurality being tunable by an associated input module to a plurality of distinct wavelengths, wherein the sources for emitting beams of coherent light associated with at least two input modules illuminate at least one tunable receiver at the particular wavelength associated with the destination module; and means responsive to said receivers for generating a control signal to cause one of the at least two input modules to transmit its cell to the destination output module if none of the sources for emitting coherent light is illuminating its associated tunable receiver at said particular wavelength.

14. The apparatus of claim 13 further comprising an electronic status bit associated with each of the plurality of input modules, the value of the status bit determining which of the sources for emitting coherent light illuminates at least one tunable receiver, each of said input modules controlling the value of an associated status bit to indicate illumination of an associated tunable receiver at the particular wavelength by another of the sources for emitting coherent light.

15. The apparatus of claim 13 wherein the sources for emitting beams of coherent light are tunable lasers.

16. The apparatus of claim 15 wherein the tunable lasers and tunable receivers of said first and third plurality respectively include a plurality n of said tunable lasers and a plurality n of said tunable receivers, and wherein a particular tunable laser numbered i only illuminates tunable receivers numbered i+1 , i+2 . . . , n.

17. The apparatus of claim 15 wherein the tunable lasers and tunable receivers of said second plurality include n tunable lasers and n tunable receivers, tunable laser i illuminating every tunable receiver.

18. The apparatus of claim 16 further comprising a plurality of passive optical interconnects associated with the first, second, and third plurality of tunable lasers and tunable receivers.

19. The apparatus of claim 15 wherein there are p priority classes for cells to be transmitted to a destination module and wherein the first, second and third plurality of tunable lasers and tunable receivers operate in one phase of operation and further comprising, for cells belonging to one of said p priority classes, p–1 sets of tunable lasers and tunable receivers which operate in another phase of operation.

20. The apparatus of claim 18 wherein each of said passive optical interconnects is a linear optical bus, each interconnect including a plurality of access couplers positioned along the bus for optically coupling the tunable lasers and the tunable receivers associated therewith.

21. An apparatus for photonic contention resolution in a switch including a plurality of input modules and a plurality of output modules, each of the output modules being associated with a particular wavelength, at least two of the plurality of input modules having cells to be transmitted to a destination output module, the photonic contention resolution apparatus comprising:

a plurality of lasers for emitting beams of coherent light, each of the lasers being tunable by an associated input module to a plurality of distinct wavelengths dependent on the destination output module;

a plurality of heterodyne receivers, each of said receivers being associated with one of said lasers, wherein each of said tunable lasers illuminates at least one of the plurality of receivers at the particular wavelength associated with the destination output module, and wherein one of the at least two input modules transmits its cell to the destination output module if none of the plurality of lasers is illuminating the receiver associated with the laser associated with said one of the at least two input modules at the particular wavelength; and a passive optical interconnect having an optical bus for transmitting said beams of coherent light from the lasers to the receivers, the interconnect including a first and a second plurality of access couplers, the first plurality of access couplers positioned along the optical bus for optically coupling one of the tunable lasers and the heterodyne receivers, each of the second plurality of access couplers providing a reference signal from one of the lasers to an associated heterodyne receiver, thereby eliminating the delay in detection by the receivers associated with the coherence time of the lasers so as to avoid the possibility of destructive interference.

22. An apparatus for photonic contention resolution in a switch including a plurality of input modules and a plurality of output modules, each of the output modules being associated with a particular wavelength, at least two of the plurality of input modules having cells to be transmitted to the same destination output module, the photonic contention resolution apparatus comprising:

an array of coherent light sources, each source of the array for emitting a beam of coherent light and being controlled by an associated input module;

a receiver array, each receiver of the receiver array being controlled by an associated input module, wherein each of said sources illuminates at least one receiver at a particular wavelength associated with the destination output module; and means responsive to said receivers for generating a control signal to cause a specific one of said input modules to transmit its cell to said same destination output module if none of the coherent light sources illuminates receiver associated with said specific one of said input modules at the particular wavelength.

23. The apparatus of claim 22 wherein the coherent light sources are lasers.

24. The apparatus of claim 23 wherein said laser and receiver arrays comprise n lasers and n receivers and wherein a particular one of said input modules numbered i controls lasers numbered (i,1), (i,2), ..., (i,n) and receivers numbered (i,1), (i,2), ..., (i,n).

25. The apparatus of claim 23 wherein said laser and receiver arrays comprise n lasers and n receivers and wherein a particular one of said lasers associated with an input module numbered i and an output module numbered j only illuminates receivers numbered (i+1,j), (i+2,j), ..., (n,j).

26. The apparatus of claim 23 further comprising a passive optical interconnect for transmitting the beam of light from the sources to the receivers.

27. The apparatus of claim 26 wherein the passive optical interconnect is a volume hologram grating.

28. The apparatus of claim 24 wherein the switch is a multicast switch and a specific input module has a cell to be multicast to the plurality of output modules, said specific input module controlling the lasers and receivers in a multicast mode.

29. An apparatus for photonic contention resolution in a switch including a plurality of input modules and a plurality of output modules, each of the output modules being associated with a particular wavelength, at least two of the plurality of input modules having cells to be transmitted to the same destination output module, the photonic resolution apparatus comprising:

a first coherent light source array and receiver array set, said first coherent light source array for emitting at least one beam of coherent light, each light source of said first coherent light source array and each receiver of said first receiver array being controlled by an associated input module in a first phase of operation;

a second coherent light source array and receiver array set, said second light source array for emitting at least one beam of coherent light, each light source of said second light source array and each receiver of said second receiver array being controlled by an associated input module in a second phase of operation, wherein each coherent light source of each set illuminates at least one receiver at a particular wavelength associated with the destination output module; and means responsive to said receivers for generating a control signal to cause one input module to transmit its cell to said same destination output module if none of the light sources of either set illuminates the receiver of the receiver array controlled by said one input module at the particular wavelength associated with the destination output module during either phase of operation.

30. The apparatus of claim 29 wherein said first and second coherent light source arrays are laser arrays, each of said arrays having at least one laser for emitting at least one beam of coherent light.

31. The apparatus of claim 30 further comprising an electronic status bit associated with each of the plurality of input modules, the value of the status bit determining which of the lasers illuminate at least one receiver during each phase of operation, each of said input modules controlling the value of an associated status bit to indicate illumination of an associated receiver at the particular wavelength by another laser.

32. The apparatus of claim 29, further comprising a passive optical interconnect associated with each of said first and second coherent light source array and receiver array sets.

33. The apparatus of claim 32 wherein the passive optical interconnect is a volume hologram grating.

34. The apparatus of claim 31 wherein the switch is a multicast switch and one of said input modules has a cell to be multicast to a plurality of output modules and further comprising electronic status bits associated with each of the plurality of input modules so as to provide fairness of access to the plurality of output modules.

35. The apparatus of claim 20 further comprising an electronic status bit associated with each of the plurality of input modules, the value of the status bit determining which of the lasers illuminate at least one receiver during each phase of operation, each input module controlling the value of an associated status bit to indicate illumination of an associated receiver at the particular wavelength by another laser.

36. The apparatus of claim 35 wherein the switch is a multicast switch and one of said input modules has a cell to be multicast to a plurality of output modules and further comprising an array of electronic status bits associated with each of the plurality of input modules such that each input module has a separate status bit for each output module.

37. A method for photonically resolving output contention in a switch between at least two input modules having cells to be transmitted to a destination one of a plurality of output modules, each of the output modules being associated with a particular wavelength, the method comprising the steps of:

causing a beam of coherent light having a wavelength associated with the destination one of the output modules to illuminate at least one receiver associated with each of the at least two input modules; and enabling a cell to be transmitted in the switch to the destination module from the one of the at least two input modules whose associated receiver was not illuminated by the beam of coherent light.

38. A method for photonically resolving output contention in a switch between at least two input modules having cells to be transmitted to a destination one of a plurality of output modules, each of the output modules being associated with a particular wavelength, the method comprising the steps of:

tuning a tunable laser and a tunable receiver associated with at least two input modules to the particular wavelength associated with the destination one of the output modules, wherein each tunable laser illuminates at least one other tunable receiver, one of the at least two input modules being enabled to transmit its cell to the destination output module if none of the tunable lasers is illuminating the tunable receiver associated with said one transmitting input module at the wavelength associated with said destination one of the output modules.

39. A method for photonically resolving output contention in a switch between at least two input modules having cells to be transmitted to one of a plurality of destination output modules, each of the output modules being associated with a particular wavelength and each input module having an associated status bit, the method comprising the steps of:

tuning a first plurality of tunable lasers and tunable receivers associated with the at least two input modules to a wavelength associated with the destination one of the output modules based on the value of the status bit in a first phase of operation, each tunable laser of said first plurality illuminating at least one of the first plurality of tunable receivers;

detecting which of the first plurality of tunable receivers are illuminated;

setting the value of the status bits of the at least two input modules to indicate illumination of the first plurality of tunable receivers;

tuning a second plurality of tunable lasers and tunable receivers associated with the at least two input modules to the wavelength based on the value of the status bit in a second phase of operation, each tunable laser of said second plurality illuminating at least one of the second plurality of tunable receivers;

detecting which of the second plurality of tunable receivers are illuminated by the second plurality of tunable lasers; and setting the value of each of the status bits of the at least two input modules to indicate illumination of the second plurality of tunable receivers, one of the two input modules winning contention and transmitting its cell to the destination output module if none of the tunable lasers has illuminated the tunable receivers associated with the one of the input modules winning contention.

40. An apparatus for photonic contention resolution in a switch which includes a plurality of input buffers and a plurality of output buffers, said apparatus comprising a plurality of tunable coherent laser light sources each associated with an input buffer, a plurality of tunable light receivers, each of said receivers also associated with an input buffer, means responsive to cells in the switch input buffers to be transmitted through the switch for tuning said laser light sources and for tuning said associated light receivers dependent on the output buffers to which said cells are to be transmitted through the switch, passive optical coupling means for coupling light from said tunable laser light sources to said tunable receivers, and means responsive to said receivers for transmitting a control signal to a particular input buffer to control the transmission of a cell through the switch dependent on the receiver associated with said particular input buffer not being illuminated by light from the input sources at the distinct wavelength associated with the output buffer to which the cell is to be transmitted.

41. A method for photonically resolving output contention in a switch between input modules of the switch having cells to be transmitted to a destination output module of the switch, each of said input modules having an associated status bit and each of said input modules having an associated one of first, second, and third tunable lasers and first, second, and third tunable receivers, the method comprising the steps of tuning first and second tunable lasers to a wavelength associated with the destination output module for a first value of the status bit, each of said first and second tunable lasers illuminating at least one of the first and second tunable receivers;

tuning the third tunable lasers to the wavelength for a second value of the status bit, each third tunable laser illuminating at least one of the third tunable receivers; and detecting which of the first, second and third tunable receivers are illuminated, wherein one of the input modules wins contention and transmits its cell to the destination output module if none of the first, second, or third lasers has illuminated the tunable receivers associated with that input module.

42. A method for photonically resolving output contention between a plurality of input modules in a switch each having a cell to be transmitted to the same one of a plurality of destination output modules in the switch, each of the output modules being assigned a particular wavelength, the method comprising the steps of energizing an array of tunable coherent light sources each controlled by a particular input module to emit a beam of coherent light at the particular wavelength associated with a destination output module for which the cell at the input module is intended to illuminate a plurality of tunable receivers, each receiver being also controlled by a particular input module; and enabling the cell to be transmitted to the destination output module from one of said input modules if a receiver associated with that one input module is not illuminated by any of the coherent light sources at the particular wavelength associated with the destination output module.

* * * * *